E. SCHNEIDER.
PANORAMIC TILTING DEVICE.
APPLICATION FILED SEPT. 26, 1913.
1,150,304.
Patented Aug. 17, 1915.
3 SHEETS—SHEET 2.
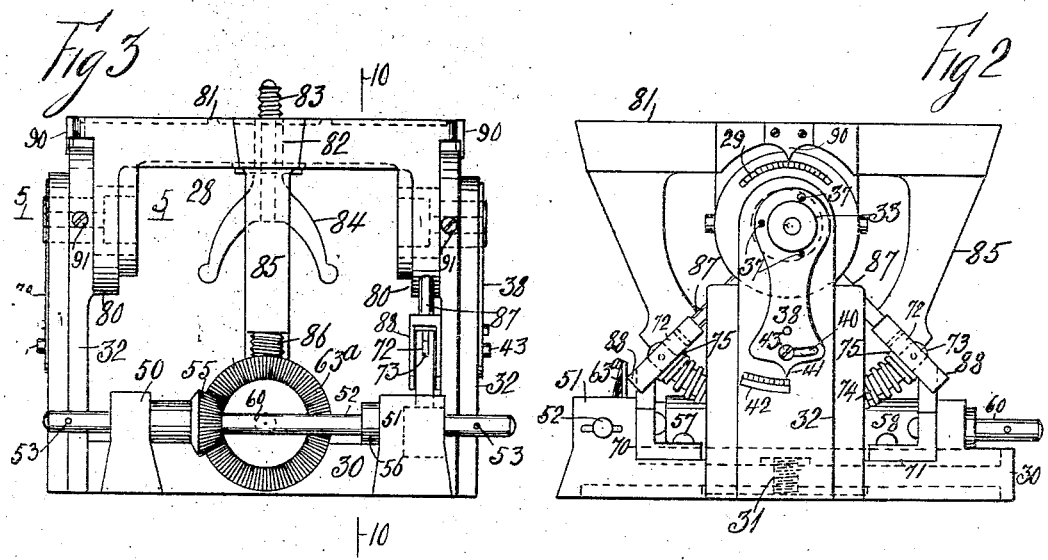
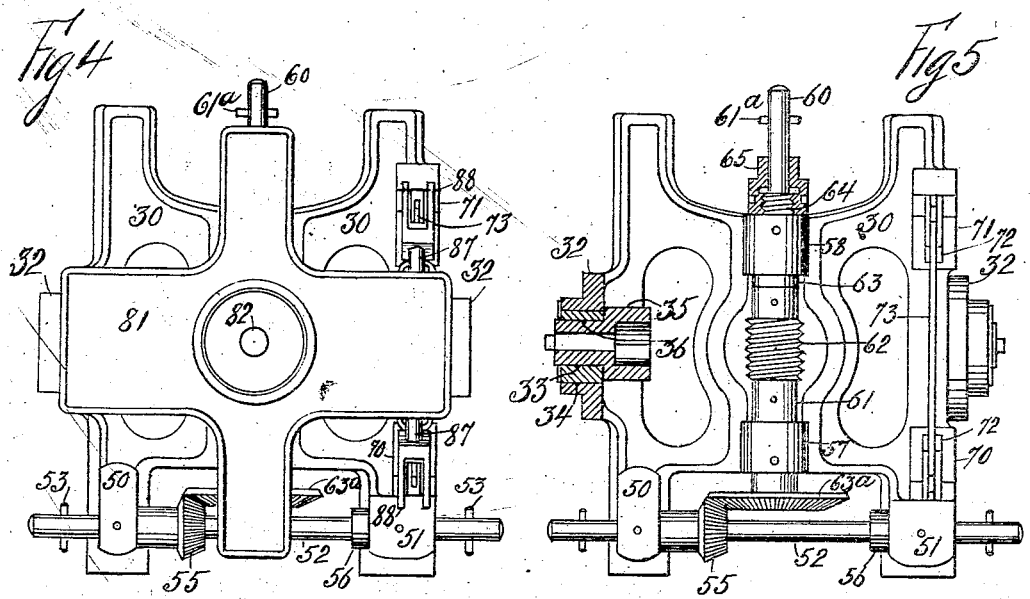

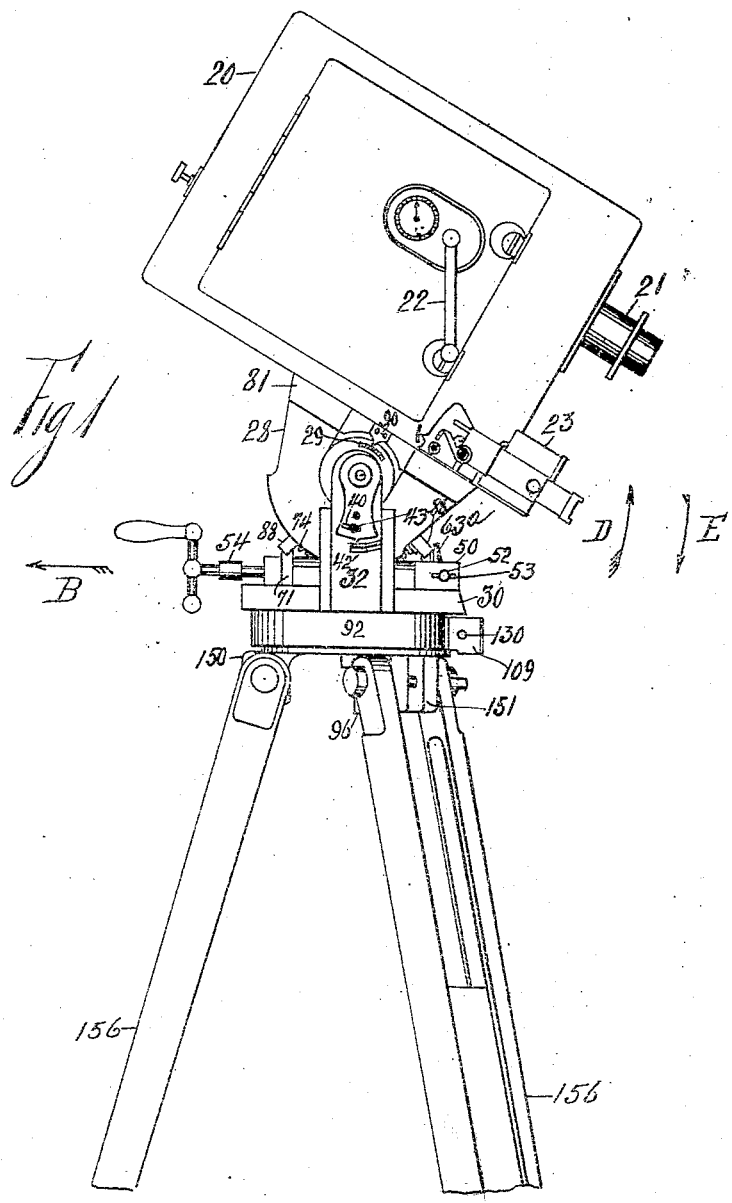

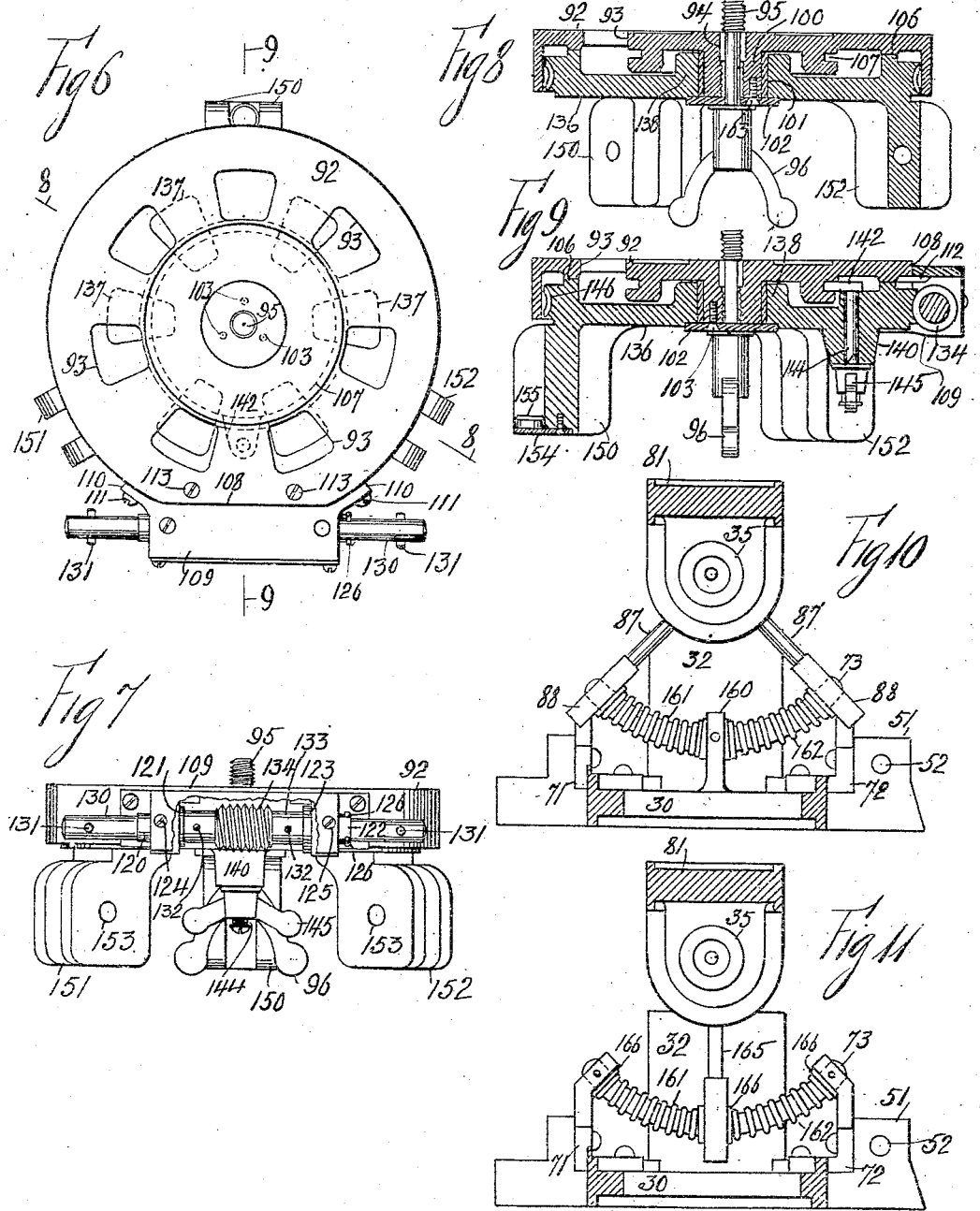

UNITED STATES PATENT OFFICE.

EBERHARD SCHNEIDER, OF NEW YORK, N. Y.

PANORAMIC TILTING DEVICE.

1,150,304.

Specification of Letters Patent.

Patented Aug. 17, 1915.

Application filed September 26, 1913. Serial No. 791,906.

*To all whom it may concern:*

Be it known that I, EBERHARD SCHNEIDER, a citizen of the United States, and a resident of the borough of Manhattan, in the county of New York and State of New York, have invented certain new and useful improvements in Panoramic Tilting Devices, of which the following is a specification.

This invention relates to a panoramic tilting device for cameras or the like.

Among its objects is the production of a tilting device for cameras, in which the panoramic platform may be maintained level and at the same time locate the camera connected thereto in a tilted position in any radial direction in a horizontal plane. A tripod supports the platform, and the invention obviates the tilting of the platform and consequent variations of the directions of the focal axis of the lens of the camera when the latter is turned with the panoramic platform.

Various other improvements are contained in the invention which will be described, and among which are means to obviate jar or tremor when the moving elements are operating, to prevent the transmission of any jar or tremor to the camera or the like for which the invention is used.

In the accompanying drawings Figure 1 shows a side elevation of the invention with a camera tilted to an inclined position, Fig. 2 shows a fragmentary enlarged portion of Fig. 1 and comprises the tilting mechanism of the invention, Fig. 3 is a left hand side view of Fig. 2, Fig. 4 represents a top plan view of Fig. 3, Fig. 5 shows a partial section of Fig. 3 on the line 5, 5 and a top plan view of the lower portion of said Fig. 3, Fig. 6 represents a top plan view of the rotatable panoramic platform, Fig. 7 shows a front elevation of Fig. 6 with a portion thereof broken away, Fig. 8 is a partial section of Fig. 6 on the line 8, 8, Fig. 9 shows a section of Fig. 6 on the line 9, 9, Figs. 10 and 11 represent sections of Fig. 3 on the line 10, 10 with slight modifications.

Referring particularly to Figs. 1 to 9, the tilting mechanism in Fig. 1 is represented in a tilting position. A moving picture camera is indicated at 20 with its lens casing 21, operating handle 22 and view finder 23. The camera is located upon the tilting mechanism of the invention designated in its entirety by the numeral 28. The said mechanism comprises a frame with the bed plate 30 having the central threaded opening 31, and the stanchions 32 with openings for the movable eccentric bearings 33 and scales 29. The surface of the bearing 33 is eccentric with its outer surface 34 thereof. Journals 35 have formed therewith the shouldered portions 36, which latter are supported in the bearings 33. To the bearings 33 are secured by means of the screws 37 the pointers 38 to be enabled to adjust the locations of said bearings 33. The said pointers have openings at their upper ends that engage the shouldered portions 36 of the bearings 33. An elongated opening 40 is formed in each pointer 38 which is concentric with the opening in the upper portion thereof that encircles the shouldered portion 36. A tip 41 is formed at the lower end of the pointer for a scale 42 formed on the outer surface of the stanchion 32. A clamping screw 43 engages the opening 40 and is in threaded engagement with an opening in the stanchion 32. The bed plate 30 of the said frame has formed therewith the pillow blocks 50, 51 for the sector driving shaft 52. The shaft has the key pins 53 extending therethrough near its ends for the removable operating handle 54. A bevel pinion 55 is fastened to the shaft 52. A collar 56 fastened to the shaft 52 bears against the pillow block 51. A pair of journal boxes 57, 58 are formed with and extend up from the bed plate 30 and have journaled therein the second sector driving shaft 60. To the latter shaft and between the journal boxes 57, 58 is fastened the sleeve 61 of the worm 62, and a collar 63 on the shaft 60 is interposed between one end of the sleeve 61 and the journal box 58. The shaft 60 supports the key pin 61ª, the bevel gear 63ª, meshing with the pinion 55 and has formed therewith the threaded portion 64 which is engaged by the clamping nut 65, to be enabled to adjust the position of the said worm along its longitudinal axis to take up the back lash with its sector to be described. A pair of knee brackets 70, 71 are fastened to the bed plate 30 and have formed therewith bifurcated ends 72 in which are fastened the ends of the curved spring support 73, for the spring 74. Washers 75 are located at the ends of said spring and encircle the support 73.

Upon the journals 35 are supported the bearings 80 of the tilting table 81 for the tilting mechanism 28. The said table has formed therewith the opening 82, for the clamping screw 83 having the wing head 84. The camera 20 is held in place upon the table 81 by means of the screw 83. A sector 85 extends from the table 81 and has formed therewith worm wheel teeth 86, that mesh with the worm 62. The locations of the teeth 86 can be adjusted relatively to the worm by turning the bearings 33 in different positions by means of the pointers 38. From the outer surface of one of the bearings 80 extend buffer arms 87 with the bifurcated ends 88. The bifurcated ends 88 are slightly wider apart than the bifurcated ends 72 of the knee brackets 70, 71. The arms 87 co-acting with the spring 74 constitute buffers for the tilting table 81. The table 81 carries pointers 90 that coact with the scales 29 on the stanchions 32. Set screws 91 are in engagement with the stanchions 28 to lock the journals 35 in place after having been adjusted.

The bed plate 30 is located upon the rotary panoramic platform 92 having the openings 93 to make it as light in weight as possible, and the axial opening 94. A clamping screw 95 with the wing head 96 extends through the openings 94 and engages the opening 31 of the bed plate 30, to clamp the said bed plate to the panoramic platform 92. A barrel 100 is formed with the platform 92 and is encircled by the wearing sleeve 101. A disk support 102 is fastened to barrel 100 by means of the screws 103. The platform 92 has formed therewith the circular bearing strip 106 and the circular clamping groove 107. A flattened edge 108 is formed with the platform 92 against which bears the casing 109. The latter has extending therefrom the lugs 110, which are fastened to the platform 92 by means of the screws 111. Lugs 112 also extend from said casing and are fastened to the platform by means of the screws 113. In the casing 109 are supported the sleeve bearings 120 and 122 for the platform driving shaft 130. Encircling said shaft and adjacent to the accompanying faces of said sleeve bearings are located the washers 121 and 123. A screw 124 clamps the sleeve bearing 120 in place and a screw 125 clamps the sleeve bearing 122 in place. Screws 126 in threaded engagement with the casing 109 bear against the washer 123 to adjust the worm to be described along its longitudinal axis. Key pins 131 are supported in the shaft 130, and to said shaft is fastened, by means of the screws 132, the worm sleeve 133 of the worm 134.

A platform supporting table is indicated in its entirety by the numeral 136. The table has formed therewith the openings 137 to decrease its weight and central bearing sleeve 138 that engages the wearing sleeve 101. The table 136 has extending therefrom the barrel 140 through which extends the clamping bolt 141. The said bolt has the sector shaped head 142, that registers with the groove 107 and also has the threaded end 144, for the wing nut 145. By means of the bolt 141 the platform 92 can be locked in different horizontal angular positions, relatively to the table 136. Worm wheel teeth 146 are formed in the circumferential surface of said table and mesh with the worm 134. From the lower face of the table 136 extend the pairs of lugs 150, 151, 152, each having an opening 153. To the lugs 150 is fastened a plate 154 that supports a spirit level 155. To each pair of said lugs is fastened a leg 156 forming with said table a tripod.

Referring to Fig. 10 which shows a modification of the invention, a stanchion 160 extends up from the bed plate 30 and preferably clamps the central portion of the spring support 73. In place of one spring 74 a pair of springs 161, 162 are substituted, so that one of the buffer arms 87 coacts with the spring 161, and the other buffer arm coacts with the spring 162.

In Fig. 11 in place of the pair of buffer arms 87, a single buffer arm 165 is substituted, the springs 161, 162 remaining. The buffer arm during the tiltings of the table 81, bears against the washers 166 carried on the support 73 and thereby coacts with the springs thereon and forms a buffer therewith for the tilting mechanism.

The operation of the invention is evident from the above description and will therefore be only tersely described. The legs 156 of the tripod are spread so as to locate the camera and tilting device at a proper level for the easy control of the operator. The panoramic platform 92 is located by means of the spirit level 155 to locate the upper face of the platform 92 in a horizontal plane. The camera 20 is then tilted at the proper angle by engaging the removable operating handle 54 with either end of the sector driving shaft 52 or the shaft 60. During the tilting of the tilting table 81, all jar or tremor is obviated by reason of the function of the buffer comprising the coaction of the spring on the support 73 and the buffer arms 87 extending from the bearings 80. The back lash between the worm 62 and worm wheel teeth 86 is taken up by locating the eccentric bearings 33 in proper position and which is also another means of avoiding tremor or jar when the table 81 is tilted. The location of the bearings 33 is indicated by the tip 41 and scale 42. The axial longitudinal adjustment of the worm 62, by means of the clamping nut 65 provides further means for preventing tremor or jar and which is so essential if a clear picture is to be taken with the camera 20, when the latter is moving. To turn the tilting mechanism 28, the operator engages the handle 54 with either end of the platform driving shaft 130. To prevent jar during the latter operation the back lash between the worm 134 and the worm wheel teeth 146 is taken up by means of the screws 126 as already indicated.

The invention may be modified by connecting the bearings 35 with any suitable element, and then only one of the pointers 88 would be necessary. In the form of the invention shown both pointers are used so that both the bearings 35 may be located in relatively the same position in their bearings 33. In place of the operating handle 54, the platform driving shaft 130 might be driven by an electric motor, or any other suitable means of power. The lugs 150, 151, 152 constitute novel adjuncts for the platform supporting table 136 by reason of being formed or cast therewith. The coaction of the bevel pinion 55 and bevel gear 63 enables the operator to tilt the tilting table 81 at two different speeds. The pointers 90 and the scales 29 indicate the angles to which the table 81 is tilted.

The jar or tremor in a tilting table of the character described without the means for preventing the same, is due to the general construction of such a device. Referring to the drawings it will be noted that the combination of the elements including the camera 20, the tilting table 81 with its sector 85 having the worm wheel teeth 86, and the worm 62, constitute a lever of the first order. The point of applied force being at the contact of the worm 62 with the teeth 86, the fulcrum at the journals 35 and the weight comprises the table 81 and the camera 20. When the worm is turned to raise the table 81 from an inclined position as shown in Fig. 1, the horizontal component of the force due to the weight of the tilting mechanism 28 and the camera, takes the direction indicated by the arrow B (Fig. 1) and if the operator then turns the operating handle 40 in a direction to raise the camera as indicated by the arrow D or from any inclined to a horizontal position, then no jar or tremor would ordinarily occur even without the novel means of this invention for taking up the back lash of various elements particularly between the worm 62 and the worm wheel teeth 86 as described. But in case the operator wishes to move the camera from a horizontal to an inclined position or say in the direction of the arrow E, then instantly after the horizontal position of the tilting table 81 is passed and supposing the camera to lean forward as shown in Fig. 1, the horizontal component of the force against the worm 62 still takes the direction of the arrow B and the turning of the worm pulls its threads away from the teeth 86 and the back lash between the threads of the worm and the teeth 86 produces jar or tremor, and which the improvements of this invention obviate.

Having described my invention what I desire to secure by Letters Patent and claim is:

1. In an apparatus of the character described the combination of a tilting mechanism, means to prevent jar or tremor during the tilting of said mechanism, a rotary panoramic platform supporting said tilting mechanism and means to prevent jar or tremor during the rotations of said platform.

2. In an apparatus of the character described the combination in a tilting mechanism comprising a bed plate, a tilting table supported over the bed plate, means to tilt the table and a buffer coacting between the table and bed plate.

3. In an apparatus of the character described the combination in a tilting mechanism comprising a bed plate, stanchions extending from the bed plate, bearings in the stanchions, a tilting table supported on said bearings, means to tilt the table, a spring supported above said bed plate, a buffer arm extending from the tilting table and coacting with said spring.

4. In an apparatus of the character described the combination in a tilting mechanism, comprising a bed plate, stanchions extending from the bed plate, bearings in the stanchions, a tilting table supported on said bearings, means to tilt the table, a spring support located over said bed plate, a spring on said support, a pair of buffer arms extending from the tilting table, one arm coacting with one end of the spring during the tilting of the table.

5. In an apparatus of the character described the combination in a tilting mechanism comprising a bed plate, stanchions extending from the bed plate, bearings in the stanchions, a tilting table supported on said bearings, means to tilt the table, brackets extending up from the bed plate, a spring support with the ends thereof fastened to said brackets, a spring on said support, buffer arms extending from the table, one coacting with one end of the spring while the other end of the spring coacts with one of said brackets.

6. In an apparatus of the character described the combination in a tilting mechanism thereof of a bed plate, stanchions extending from the bed plate, bearings in the stanchions, journals for the bearings, a tilting table supported on said journals, means to tilt the table, brackets extending up from the bed plate, a spring support fastened to said brackets, a spring on said support, with its ends held from moving by means of said brackets, buffer arms extending from the table enabled to swing past the brackets and compress said spring.

7. In an apparatus of the character described the combination in a tilting mechanism thereof of a bed plate, a worm journaled in said bed plate, stanchions extending from the bed plate, eccentric bearings supported in openings in said stanchions, journals supported in the bearings, a tilting table supported on the journals, worm wheel teeth formed with the tilting table and meshing with said worm, means to adjust the eccentric bearings so as to adjust said worm wheel teeth with said worm to take up back lash and obviate jar when said table is tilted.

8. In an apparatus of the character described the combination in a tilting mechanism thereof of a bed plate, a worm journaled in said bed plate, stanchions extending from the bed plate, eccentric bearings movably supported in openings in said stanchions, journals supported in the bearings, a tilting table supported on the journals, worm wheel teeth formed with the tilting table and meshing with said worm and pointers fastened to the eccentric bearings having tips extending therefrom coacting with scales formed on the accompanying stanchions to adjust said bearings and prevent jar when tilting the table.

9. In an apparatus of the character described the combination in a tilting mechanism thereof of a bed plate, a worm journaled in said bed plate, stanchions extending from the bed plate, eccentric bearings movably supported in openings in said stanchions, journals supported in the bearings, a tilting table supported on the journals, worm wheel teeth formed with the tilting table and meshing with said worm, a pointer fastened to one of the eccentric bearings having a tip extending therefrom coacting with a scale formed on its accompanying stanchion to adjust said bearing and means to clamp the pointer in place.

10. In an apparatus of the character described the combination of a bed plate, stanchions for the bed plate, journals supported on the stanchions, a tilting table supported on the journals, a pointer on the table coacting with a scale on one of the stanchions to indicate the angular position of the said table.

11. In an apparatus of the character described the combination of a bed plate, journals above the bed plate, a tilting table supported upon said journals and flexible means interposed between the bed plate and tilting table to obviate jar when tilting said table.

12. In an apparatus of the character described the combination of a bed plate, journals above the bed plate, a tilting table supported on the journals, a sector having worm wheel teeth formed therewith extending from said table, a worm journaled in the bed plate meshing with said worm wheel teeth and means connected with the worm to take up the back lash between it and said worm wheel teeth.

13. In an apparatus of the character described the combination of a bed plate, journals above the bed plate, a tilting table supported on said journals, a sector extending from said table having worm wheel teeth formed therewith, a sector driving shaft journaled in the bed plate, a bevel gear on said shaft, a second driving shaft journaled in the bed plate, a bevel gear on the said second shaft meshing with the first bevel gear and means to directly turn either driving shaft.

14. In an apparatus of the character described the combination of a bed plate, journals above the bed plate, a tilting table supported on the journals, a sector for the table having worm wheel teeth formed therewith, journal boxes for the bed plate, a sector driving shaft having a threaded portion journaled in the said journal boxes, a sleeve fastened to the shaft, with one end thereof bearing against one of the journal boxes, a collar on said shaft between the other end of said sleeve and the second journal box and a clamping nut engaging said threaded portion of the driving shaft and bearing against the second journal box on the side opposite to the location of said collar.

Signed at the borough of Manhattan in the county of New York and State of New York this 19th day of September A. D. 1913.

EBERHARD SCHNEIDER.

Witnesses:
A. A. DE BONNEVILLE,
JOHN JESSICH.